United States Patent
Tang et al.

(10) Patent No.: US 6,627,302 B1
(45) Date of Patent: Sep. 30, 2003

(54) LUBRICANT OVERCOAT FOR RECORDING MEDIA AND A PROCESS FOR MAKING THE SAME

(75) Inventors: Huan Tang, Los Altos, CA (US); Raj Thangaraj, Fremont, CA (US); Michael J. Stirniman, Fremont, CA (US); Xiaoding Ma, Fremont, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/024,383

(22) Filed: Dec. 21, 2001

Related U.S. Application Data

(60) Provisional application No. 60/279,396, filed on Mar. 27, 2001, and provisional application No. 60/279,358, filed on Mar. 27, 2001.

(51) Int. Cl.[7] .............................................. G11B 5/725
(52) U.S. Cl. ..................... 428/212; 428/216; 428/336; 428/421; 428/694 TC; 428/694 TF
(58) Field of Search ................................. 428/212, 216, 428/336, 421, 694 TC, 694 TF

(56) References Cited

U.S. PATENT DOCUMENTS

| | | | |
|---|---|---|---|
| 4,188,434 A | 2/1980 | Loran | 428/65 |
| 4,882,197 A | 11/1989 | Matsudaira et al. | |
| 4,920,919 A | 5/1990 | Matsudaira et al. | |
| 4,960,609 A | * 10/1990 | Homola et al. | 427/490 |
| 5,049,410 A | * 9/1991 | Johary et al. | 427/131 |
| 5,143,787 A | * 9/1992 | Frew et al. | 428/408 |
| 5,162,163 A | 11/1992 | Ohta et al. | 428/695 |
| 5,209,837 A | 5/1993 | Tsuya et al. | 205/162 |
| 5,331,487 A | 7/1994 | Gregory et al. | 360/97.02 |
| 5,441,655 A | 8/1995 | Odello et al. | 252/49.9 |
| 5,498,457 A | 3/1996 | Ishihara et al. | 428/65.4 |
| 5,587,217 A | 12/1996 | Chao et al. | 428/65.4 |
| 5,631,081 A | * 5/1997 | Lin et al. | 428/332 |
| 5,908,817 A | 6/1999 | Perettie et al. | 508/422 |
| 6,083,600 A | 7/2000 | Kasai et al. | 428/65.4 |
| 6,110,330 A | 8/2000 | Lin et al. | 204/192.16 |
| 6,120,836 A | 9/2000 | Usuki | 427/131 |

FOREIGN PATENT DOCUMENTS

DE          3710798          10/1987

OTHER PUBLICATIONS

Journal of Chemical Physics, "Thickness and drainage of perfluoropolyethers under compression", 2001 American Institute of Physics, vol. 114, No. 23, Jun. 15, 2001.

* cited by examiner

Primary Examiner—Stevan A. Resan
(74) Attorney, Agent, or Firm—Morrison & Foerster LLP

(57) ABSTRACT

A magnetic recording medium comprising a magnetic layer and means for resisting corrosion of the magnetic layer, and a method of making and using the magnetic recording medium are disclosed.

12 Claims, 4 Drawing Sheets

← Lubricant 24

← Overcoat 23

← Magnetic Layer 22

← Under-layer 21

← Substrate 20

← Under-layer 21'

← Magnetic Layer 22'

← Overcoat 23'

← Lubricant 24'

LUBRICANT OVERCOAT FOR RECORDING MEDIA AND A PROCESS FOR MAKING THE SAME

RELATED APPLICATIONS

This application claims priority from Provisional Application Ser. No. 60/279,396, filed Mar. 27, 2001, entitled "A Dual Lubricant overcoat Design for Improved Magnetic Disc Corrosion Performance," and Provisional Application Ser. No. 60/279,358, filed Mar. 27, 2001, entitled "A Two-Stage Lube Process For Improved Magnetic Disc Tribology," the entire disclosures of which are incorporated herein by reference.

FIELD OF THE INVENTION

The present invention relates to recording medium with a lubricant overcoat, particularly, a lubricant overcoat with at least two layers, and a method of making the same.

BACKGROUND

Most modern information storage systems depend on magnetic recording due to its reliability, low cost, and high storage capacity. The primary elements of a magnetic recording system are the recording medium and the read/write head. Magnetic discs with magnetizable media are used for data storage in almost all computer systems.

FIG. 1 shows the schematic arrangement of a magnetic disc drive 10 using a rotary actuator. A disc or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disc 11. The rotary actuator could have several suspensions and multiple magnetic heads to allow for simultaneous recording and reproduction on and from both surfaces of each medium. A voice coil motor 19, as a kind of linear motor, is provided to the other end of the arm 15. The arm 15 is swingably supported by ball bearings (not shown) provided at the upper and lower portions of a pivot portion 17.

A conventional longitudinal recording disc medium is depicted in FIG. 2 and typically comprises a non-magnetic substrate 20 having sequentially deposited on each side thereof an under-layer 21, 21', such as chromium (Cr) or Cr-alloy, a magnetic layer 22, 22', typically comprising a cobalt (Co)-base alloy, and a protective overcoat 23, 23', typically containing carbon. Conventional practices also comprise bonding a lubricant topcoat 24, 24' to the protective overcoat. Under-layer 21, 21', magnetic layer 22, 22', and protective overcoat 23, 23', are typically deposited by sputtering techniques. The Co-base alloy magnetic layer deposited by conventional techniques normally comprises polycrystallites epitaxially grown on the polycrystal Cr or Cr-alloy under-layer.

A conventional longitudinal recording disc medium is prepared by depositing multiple layers of metal films to make a composite film. In sequential order, the multiple layers typically comprise a non-magnetic substrate, a seedlayer, one or more under-layers, a magnetic layer, and a protective carbon layer. Generally, a polycrystalline epitaxially grown cobalt-chromium (CoCr) magnetic layer is deposited on a chromium or chromium-alloy under-layer.

The seed layer, under-layer, and magnetic layer are conventionally sequentially sputter deposited on the substrate in an inert gas atmosphere, such as an atmosphere of pure argon. A conventional carbon overcoat is typically deposited in argon with nitrogen, hydrogen or ethylene. Conventional lubricant topcoats are typically about 20 Å thick.

Lubricants conventionally employed in manufacturing magnetic recording media typically comprise mixtures of long chain polymers characterized by a wide distribution of molecular weights and include perfluoropolyethers, functionalized perfluoropolyethers, perfluoropolyalkylethers (PFPE), and ftnctionalized PFPE. "Molecular weight" is the sum of the atomic weights of all the atoms in a molecule. A "functionalized" hydrocarbon, such as functionalized perfluoropolyethers, is a hydrocarbon in which an atom or a group of atoms, acting as a unit, has replaced a hydrogen atom in the hydrocarbon molecule and whose presence imparts characteristic properties to this molecule.

PFPE do not have a flashpoint and they can be vaporized and condensed without excessive thermal degradation and without forming solid breakdown products. The most widely used class of lubricants includes perfluoropolyethers such as AM 2001®, Z-DOL®, Ausimont's Zdol or Krytox lubricants from DuPont.

There is a demand in computer hard drive industry to develop an areal storage density of 100 Gbits/inch$^2$ and higher in the future. With this high areal density, the flying height between the read-write head and the media has to be minimized. Current magnetic hard disc drives operate with the read-write heads only ~10 nanometers above the disc surface and at rather high speeds, typically a few to a few tens of meters per second. Because the read-write head can contact the disc surface during operation, a thin layer of lubricant overcoat is coated on the disc surface to reduce wear and friction. The overcoat thickness of the hard disc on these future disc-drives is estimated to be less than 3 nm.

With the carbon overcoat as thin as $\leq 3$ nrm, the overcoat may fail to completely cover the magnetic recording layer. Corrosion of the magnetic layer at those locations where overcoat coverage is imperfect could be a major cause of drive failure. To ensure good corrosion resistance, applicants have found that an overcoat having the ability to minimize or prevent corrosion of the magnetic layer is required and a traditional overcoat material, such as hydrogenated (a-C:H) or nitrogenated (a-C:N) carbon, could be insufficient in protecting the hard disc media or read-write head from corrosion at the thickness level of less than 5 nm.

As hard disc drive technology is pushed to higher and higher recording densities, the industry is faced with an increasingly difficult task of maintaining the tribological robustness of the head-disc interface (HDI). The carbon overcoat and the lubricant film on top of the magnetic recording layer are the main components of a hard disc that control its tribological performance. Tribological performance is characterized in several aspects, including wear durability and corrosion resistance of the media. Higher areal density recording demands reduced head-medium spacing, which in turn requires reduced carbon overcoat thickness and, to a lesser degree, reduced lubricant film thickness. However, if the thickness of the carbon overcoat is about 50 Å or less, the corrosion protection it provides is greatly compromised. Although there are ways to improve corrosion resistance provided by the carbon overcoat properties, e.g., by increasing its density and changing its electrical conductivity, there is a limit as to how much corrosion resistance a carbon overcoat just a few atomic layers thick can provide.

Wear and friction have been recognized as potential problems for the head/disc interface. One solution for improving the wear resistance of the media is proposed in U.S. Pat. No. 5,674,638 (Grill). Grill suggests using a thick fluorinated diamond-like carbon layer of thickness in the range between 3 nm and 30 nm. Grill uses a thick fluorinated carbon overcoat to improve wear resistance, which generally increases with increased thickness.

One way of improving upon the inherently poor corrosion performance of thin carbon overcoats is to consider the lubricant in combination with the carbon overcoat as a means to maximize corrosion protection. Towards this end, solutions mostly involved the use of a lubricant additive, such as phosphazene or phosfarol, which provide an increase in corrosion protection. These additives react in some fashion with high-energy sites on the carbon surface, where it is believed that corrosion is most likely to initiate. Thus, the blocking of these sites from contact with corrosion sources in the environment, such as moisture and oxygen, provides higher corrosion resistance. However the use of lubricant additives can lead to other problems, such as phase separation of the additive and lubricant, which can degrade the flying behavior of the read/write head and cause the drive to fail.

As the fly height decreases, contact between the media and read/write head will likely increase. As a result, there is a need for a high performance carbon overcoat/lubricant system with enhanced protection characteristics. U.S. Pat. No. 6,110,330 discloses a recording media with a read/write zone and a takeoff/landing zone. Because these two zones are likely to experience different stresses during operation, the recording media is designed to accommodate these different stresses. The media is designed with two different carbon coatings. Each coating is optimized for each zone. Once the carbon coatings are in place a lubricant is added, which is believed to interact differently with each coating zone.

A lubricant overcoat containing two or more lubricants has also been used in an attempt to provide additional protection. U.S. Pat. No. 5,498,457 discloses using a lubricant mixture of two fluoropolyethers. These fluoropolyethers are able to cross-link with another, thus providing a more stable lubricant overcoat with a thickness of over 100 Å. U.S. Pat. No. 5,331,487 discloses a lubricant overcoat containing a functionalized perfluoropolyether bonded to a carbon overcoat, and a mobile, non-bonded lubricant. The non-bonded lubricant can be a perfluoropolyether or any type of lubricant with limited volatility.

Despite these advances proposed in the prior art, there still exists a need for a thin overcoat for a magnetic recording medium that has good corrosion resistance and does not have a tendency to phase separate.

SUMMARY OF THE INVENTION

An embodiment of this invention is a magnetic recording medium, comprising a substrate; a magnetic layer on the substrate; a carbon overcoat on the magnetic layer; and a lubricant overcoat on the carbon overcoat, the lubricant overcoat comprising an under-layer which is fully bonded to the carbon overcoat and an over-layer on the under-layer, wherein at least a portion of the over-layer can move on the under-layer. The term "a portion of" is defined herein to include all or part of a layer.

The under-layer comprises a compound selected from the group consisting of functionalized perfluoropolyethers, functionalized perfluoropolyalkylethers, phosphazene and phosfarol. The under-layer could be vapor deposited on a fresh carbon surface. The under-layer could have a thickness from about 5 Å to about 15 Å. In one embodiment, a component of the under-layer has a molecular weight that is less than a molecular weight of a component of the over-layer.

Preferably, the under-layer comprises a compound comprising a molecular weight selected from the group consisting of less than 3000 atomic mass unit (amu, also known as dalton), of less than 2500 amu, of less than 2000 amu, and of less than 1500 amu. The over-layer could have a thickness from about 5 Å to about 15 Å. The over-layer could comprise a lubricant or a compound comprising a molecular weight selected from the group consisting of at least 2000 amu, of at least 3000 amu, of at least 4000 amu, and of at least 4500 amu. Preferably, the over-layer comprises a lubricant selected from the group consisting of perfluoropolyethers, functionalized perfluoropolyethers, perfluoropolyalkylethers, and functionalized perfluoropolyalkylethers. The carbon overcoat could comprise a thickness selected from the group consisting of from about 10 Å to about 80 Å, from about 10 Å to about 50 Å, and from about 10 Å to about 40 Å.

Another embodiment of this invention is a method for preventing corrosion of a magnetic layer due to contact start-stop of a recording medium, comprising depositing a carbon overcoat on the magnetic layer and depositing a lubricant overcoat on the carbon overcoat, the lubricant overcoat comprising an under-layer which is fully bonded to the carbon overcoat and an over-layer on the under-layer, wherein at least a portion of the over-layer can move on the under-layer.

Yet another embodiment is a method of making a magnetic recording medium, comprising providing a substrate with a magnetic layer, and a carbon overcoat; depositing a lubricant overcoat on the carbon overcoat, the lubricant overcoat comprising an under-layer which is fully bonded to the carbon overcoat and an over-layer on the under-layer, wherein at least a portion of the over-layer can move on the under-layer. The under-layer could comprise a thickness selected from the group consisting of from about 1 Å to about 30 Å, from about 5 Å to about 25 Å, and from about 10 Å to about 20 Å. The over-layer could comprise a thickness selected from the group consisting of from about 1 Å to about 30 Å, from about 5 Å to about 25 Å, and from about 10 Å to about 20 Å. In a preferred embodiment, the under-layer could be deposited on a fresh carbon surface by a vapor lube process. The over-layer could be deposited by a process selected from the group consisting of dip coating and vapor deposition.

Another embodiment if this invention is a magnetic recording medium, comprising a magnetic material and means for resisting corrosion of the magnetic material. Also, "means for resisting corrosion of the magnetic material" refers to a dual layer lubricant comprising a fully bonded under-layer on a surface of a carbon-containing overcoat layer and equivalents thereof. In this invention, a layer is considered to be "fully bonded" to a surface if the layer cannot be washed off from the surface with a solvent.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

The present invention will be better understood by reference to the Detailed Description of the Invention when taken together with the attached drawings.

DETAILED DESCRIPTION OF THE INVENTION

As the overcoat thickness on magnetic thin film media continues to decrease to near atomic levels, the corrosion protection of the underlying magnetic media becomes paramount. To prevent electrical signal degradation and possible loss of head flying characteristics, the overcoat, even at these near-atomic levels, and the lubricant overcoat on the overcoat must provide corrosion protection to the magnetic layer of the media.

The invention is directed to a recording medium with a carbon overcoat and a lubricant overcoat that provides optimal tribological performance. The magnetic recording medium contains a substrate, a magnetic layer, a carbon overcoat, and a lubricant overcoat. The lubricant overcoat comprises an under-layer that is fully bonded to a fresh carbon surface of the carbon overcoat and an over-layer deposited on the under-layer.

One way, for example, in which an under-layer could be fully bonded to a carbon overcoat on a magnetic recording medium would be when substantially all active sites of the carbon overcoat are chemically bonded to a low-molecular weight species present in the under-layer. Chemical bonding includes ionic bonding, covalent bonding (which includes hydrogen bonding), metallic bonding and bonding due to Van der Waals forces. See McGraw-Hill Encyclopedia of Science and Technology, Vol. 3, 44–45 (1982), which is incorporated herein by reference.

Figure 1:
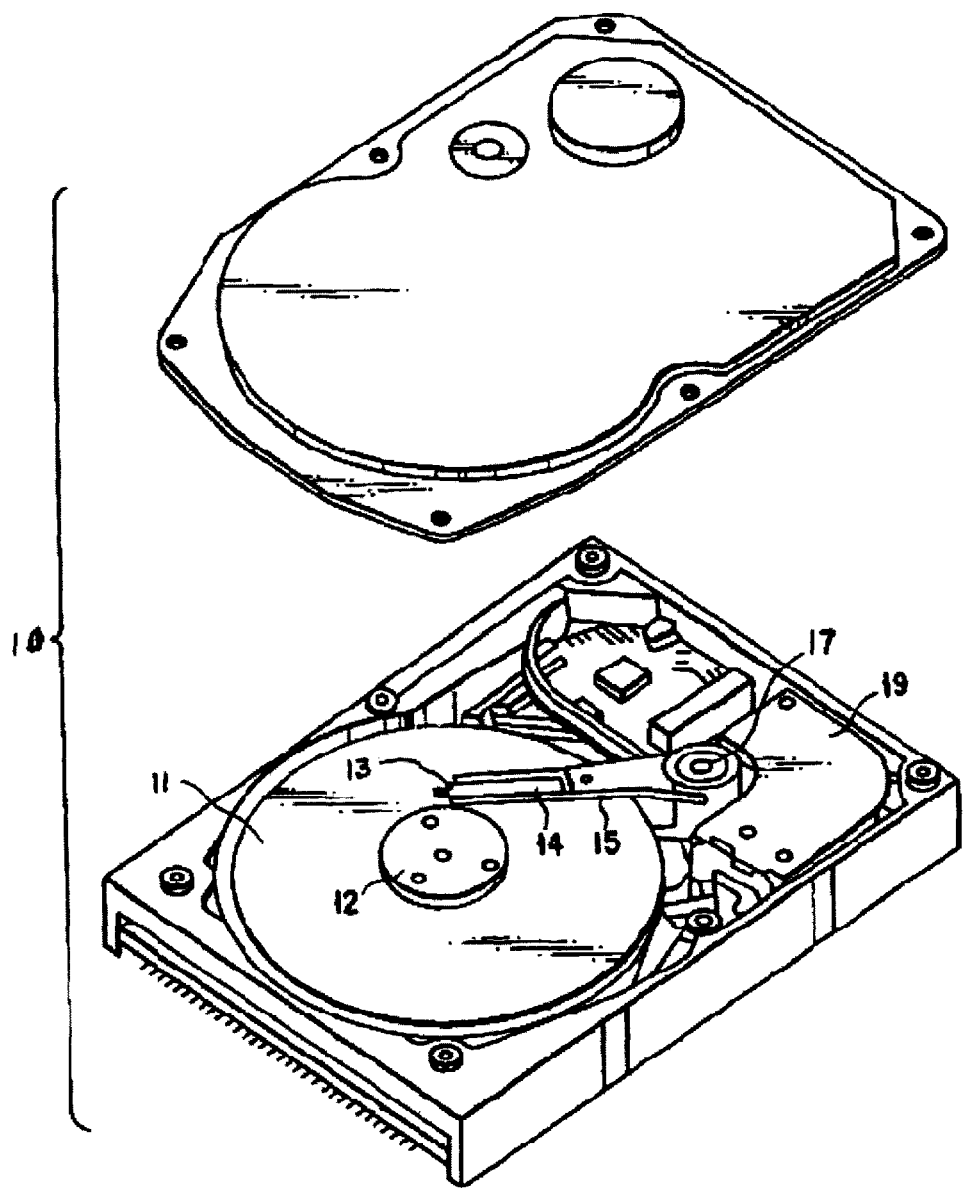
FIG. 1 is a view of a magnetic disc drive.
Figure 2:
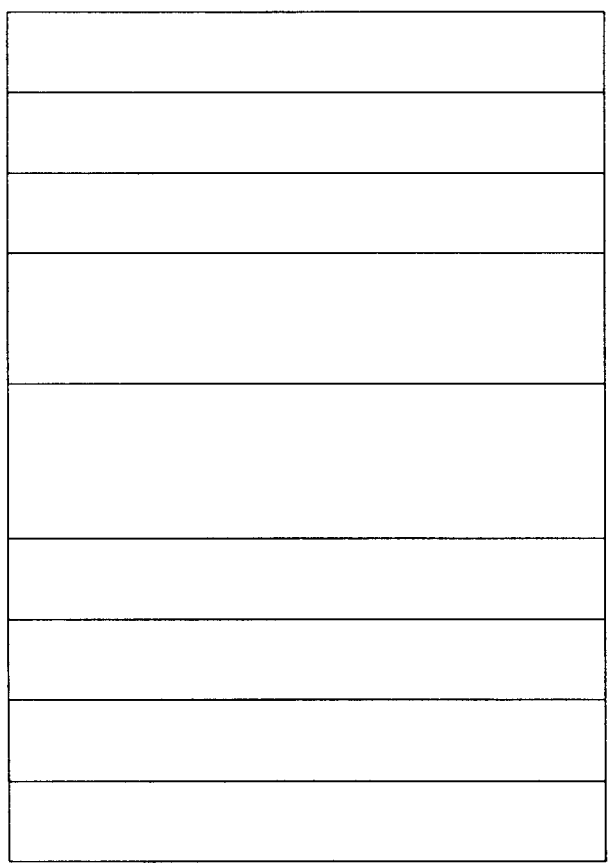
FIG. 2 schematically shows a conventional magnetic recording medium (Prior Art).
Figure 3:
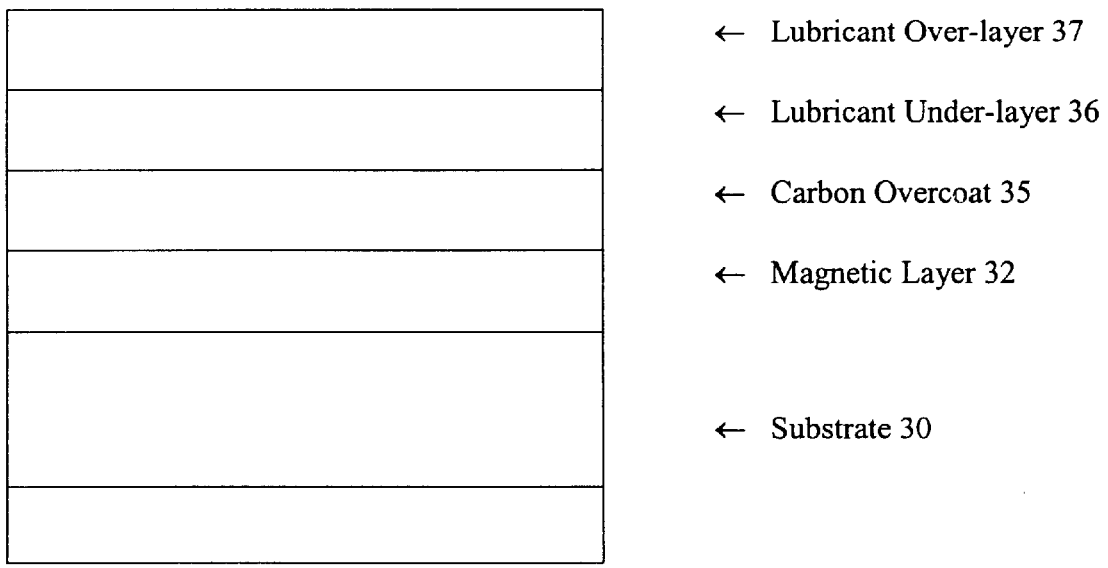
FIG. 3 is a schematic representation of one embodiment of a recording medium of the invention.

An embodiment of a recording disc medium of this invention is depicted in FIG. 3, which comprises a nonmagnetic substrate 30 having sequentially deposited on one side thereof a magnetic layer 32, typically comprising a cobalt (Co)-base alloy, a carbon overcoat 35 and a lubricant overcoat having an under-layer 36 and an over-layer 37. In addition, the disc medium of this invention could comprise layers below the magnetic layer 32.

The under-layer could contain a compound, for example, a low-molecular weight species such as functional perfluoropolyethers. The over-layer could contain a lubricant comprising a high-molecular weight species.

In this invention, the term "low-molecular weight species" refers to a lower molecular weight species in the under-layer relative to a higher molecular weight species in the over-layer. Similarly, the term "high-molecular weight species" refers to a higher molecular weight species in the over-layer relative to a lower molecular weight species in the under-layer.

The carbon overcoat could be sputtered, amorphous carbon, or ion-beam deposited diamond-like carbon. The lubricant overcoat is then deposited on the carbon overcoat.

One method for applying a lubricant film, which could be either the under-layer or the over-layer, on the disc is dip coating, in which the disc, after sputter, is first immersed in a solution containing an appropriate concentration of lubricant molecules. The disc is then withdrawn from the solution at an appropriate speed, or alternatively, the solution is drained from the container at an appropriate rate, to leave a lubricant film of the desired thickness on the surface. This process, due to its ex-situ nature, typically yields a relatively small amount of bonded lubricant.

An alternative method of applying lubricant is vapor coating, in which the lubricant molecules in a vapor generated from its liquid phase by heating, impinge and remain on the carbon surface. This is in-situ vapor-coating technique, in which the lubricant film is applied in vacuum on freshly sputtered carbon. The in-situ method is extremely effective at enhancing lubricant bonding, as the carbon surface is never exposed to the ambient environment throughout the process. As much as a full monolayer of lubricant can be bonded to carbon surfaces with a high concentration of dangling bonds (or high-energy sites).

In one embodiment, the low-molecular weight species could be deposited on the carbon overcoat, preferably under reduced pressure, in a vapor deposition chamber. The low-molecular weight species could be fully bonded, and can be vapor-phase deposited in-situ on the freshly prepared carbon surface in vacuum. Preferably, the deposition of both the carbon overcoat and the low-molecular weight species could take place in a single deposition unit. In this manner, one or more functional groups of the low-molecular weight species can react with a fresh carbon surface of the carbon overcoat prior to exposing the carbon overcoat to ambient atmosphere.

The deposition unit can have separate deposition chambers. For example, a first deposition chamber could be used to deposit the carbon overcoat on the magnetic layer of a magnetic recording medium. The magnetic recording medium would then be transferred to a second deposition chamber without exposing the magnetic recording medium to an ambient or oxidizing atmosphere. For example, following carbon deposition, the first deposition chamber can be back-filled with an inert gas, e.g., helium, argon, and, in some case, nitrogen. The magnetic recording medium can then be transferred to the second deposition chamber, which is also filled with an inert gas. Alternatively, both chambers can be maintained under reduced pressure during the transfer process. Once the magnetic recording medium is positioned in the second deposition chamber, a low-molecular weight species, preferably capable of fully bonding the carbon overcoat, could be introduced into the second deposition chamber in a vapor form, to coat a fresh carbon surface of the carbon overcoat deposited in the first deposition chamber.

The term "fresh" in no way implies a time element to the invention. The carbon overcoat will contain a fresh carbon surface if the carbon overcoat is not exposed to a reactive or oxidizing environment prior to the low-molecular weight species being applied. If the carbon overcoat is exposed to such an environment prior to the low-molecular weight species being applied, a fresh carbon surface can be obtained by cleaning or resurfacing the carbon overcoat in an inert environment. Following resurfacing of the carbon overcoat, the low-molecular weight species can be applied. In either case, the low-molecular weight species is applied to a fresh carbon surface. Thus, the time between the formation of the carbon overcoat and the deposition of the low-molecular weight species can be a matter of minutes, hours, or even days.

Following deposition of the relatively low-molecular weight species, most if not all of the high-energy sites on the fresh carbon surface will be pacified. The high-molecular weight species could be mobile or minimally bonded, and can be applied using the ex-situ dip-coating process or the ex-situ vapor-phase deposition process, with or without vacuum.

Because the over-layer is preferably not anchored to the under-layer or does not preferably interact with the low-molecular weight species in any manner, the over-layer is relatively mobile across the surface of the under-layer. In essence, the over-layer can move along the under-layer formed by the low-molecular weight species. The lubricant in the over-layer helps reduce wear during head-disc sliding contact. Preferably, the over-layer will contain perfluoropolyethers, functionalized perfluoropolyethers, perfluoropolyalkylethers, or functionalized perfluoropolyalkylethers.

The fully bonded low-molecular weight species of the under-layer serves to enhance the media corrosion resistance and load-bearing capacity without adversely affecting other aspects of the tribological performance of the HDI, such as stiction and flyability. The mobile high-molecular weight species acts to provide additional lubrication functionality to reduce HDI wear during head-disc sliding contact. Additional benefits include keeping the total lubricant film thickness at a minimal, which is important for minimizing the (magnetic) head-medium spacing, improving the wear durability of the interface, and improving the flyability of the media.

The low-molecular weight species of the invention include lubricant additives, such as phosphazene and Phosfarol®, and functional lubricant molecules, such as Zdol®, Ztetraol® and Zdol-TX®, other functional perfluoropolyethers, or functionalized perfluoropolyalkylethers. The low-molecular weight species, which contain functional groups, e.g., an acyl, a hydroxyl, or an acid group, can interact with the high-energy sites of a fresh carbon surface of the carbon overcoat. This relatively strong interaction effectively blocks these active sites from initiating corrosion of the recording media. It is believed that by providing a fresh carbon surface for deposition of the low-molecular weight species, the active surface sites are pacified to a greater degree than if the low-molecular weight species of the invention is deposited on a non-fresh carbon surface. The enhanced pacification of the active sites provides in part the increase in corrosion resistance of the recording media.

Similar to additive molecules, functional lubricant molecules, such as Zdol, or Ztetraol, or Zdol-TX, or other functional perfluoropolyethers, can bond to the high-energy sites of the carbon surface via their active end groups and effectively block these active sites from initiating corrosion. For a functional perfluoropolyether lubricant film of a fixed thickness, the molar content is higher for molecules of lower molecular weights, and so is the concentration of active end groups. Thus, lower molecular weight lubricant films, at a given film thickness, can be more effective at preventing media corrosion, as long as they can be bonded to the active sites more effectively than their higher molecular weight counterparts. Since the density of active sites on the surface may be higher than the surface concentration of active end-groups of larger sized, or higher molecular weight, lubricant molecules, smaller-sized, or lower molecular weight, molecules always have an advantage in bonding to the surface.

Another embodiment of this invention is a two-stage lube process that applies a fully bonded under-layer and a mobile lubricant-containing over-layer independently. In this two-stage process, a sufficiently, yet not excessively, thick bonded under-layer is first applied with the in-situ vapor lube process. The disc with such a bonded under-layer is then exposed to the ambient environment, and a second mobile or minimally bonded lubricant-containing over-layer is applied with the dip coating process or with an ambient vapor lube process. Exposing the disc with a bonded under-layer also serves the purpose of further saturating the remaining active sites on the carbon surface by chemically active species that exists in the air, such as water, oxygen, and hydrocarbons, etc. Alternatively, the entire two-stage lube process can be carried out in two connected, identical vacuum lube modules. In this scheme, the disc with a bonded under-layer is dosed with some small chemically active molecules, such as water, oxygen, and hydrocarbons, with a gas doser and then transported into the second lube module for coating the second mobile or minimally bonded lubricant-containing over-layer. With this added controllability in the application of both the bonded under-layer and the mobile lubricant-containing over-layer, the properties of the lubricant overcoat can be fine-tuned to optimize the media tribological performance.

As explained above, functional perfluoropolyether could be used to coat the fresh carbon surface. Preferably, a perfluoropolyether with a relatively low-molecular weight is used to coat the fresh carbon surface. The lower the molecular weight of the perfluoropolyether, the higher concentration or density of functional groups will be available to interact with the fresh carbon surface for a given film thickness. The higher density of functional groups results in pacification of a greater number of high-energy sites, which leads to increased corrosion resistance. The higher density of functional groups can be important because depending upon carbon deposition conditions, the density of high-energy (corrosive) sites on the fresh carbon surface can be quite high.

Compounds of relatively high molecular weight may not have a high enough concentration of functional groups to pacify all or most of these sites. Because the low-molecular weight species deposited on the fresh carbon surface interacts with the high-energy sites, the low-molecular weight species is said to be bonded or anchored in some manner to the carbon surface. As a result, the low-molecular weight species is not truly mobile across the surface of the medium. The deposited low-molecular weight species increases the corrosion resistance of the recording media without adversely affecting other tribological characteristics, such as stiction and flyability. The recording medium can contain a low-molecular weight species deposited on a fresh carbon surface with a molecular weight selected from of less than 3000 amu, of less than 2500 amu, of less than 2000 amu, or of less than 1500 amu.

In one embodiment, the over-layer can have the same composition as that of the under-layer. In another embodiment, the over-layer can be different from the under-layer. Preferably, the over-layer contains a perfluoropolyether with a molecular weight that is higher than the low molecular weight species deposited on the fresh carbon surface. The under-layer can itself comprise a lubricant.

The recording medium can contain a lubricant over-layer with a molecular weight selected from of at least 2000 amu, of at least 3000 amu, of at least 4000 amu, or of at least 4500 amu. Perfluoropolyethers do not have a flashpoint and they can be vaporized and condensed without excessive thermal degradation and without forming solid breakdown products. The most widely used class of lubricants includes perfluoropolyethers such as AM 2001®, Z-DOL®, Ausimont's Zdol® or Krytox® lubricants from DuPont.

Preferably, the lubricant overcoat will have a thickness in the range from about 10 Å to about 30 Å. Preferably, the under-layer will have a thickness in the range from about 5 Å to about 15 Å. Preferably, the over-layer will have a thickness in the range from about 5 Å to about 15 Å. One benefit of the lubricant overcoat of the invention is that the overall thickness of the overcoat is minimized without adversely affecting tribological performance. Keeping the thickness to a minimum is important for minimizing the (magnetic) head-medium spacing, which is required for high areal density media, improving the wear durability of the interface, and improving the flyability of the media.

The substrate include any substrate made of a glass or glass-ceramic, NiP/Al, metal alloys, plastic/polymer material, ceramic, glass-polymer, composite materials or other non-magnetic materials. Magnetic layers that can be used in the recording media are selected from CoCrPtB, CoCrPtBTa, CoCrPtBTaNb, CoCrPt, CoCrNi, CoCrPtTa, CoCrPtTaNb, and CoCrTa.

The invention will be better understood with reference to the following examples, which are intended to illustrate specific embodiments within the overall scope of the invention as claimed.

EXAMPLE 1

An experiment was conducted to compare the corrosion performance of Co-based magnetic hard disc media on NiP/Al substrates with Zdol lubricants of two different molecular weights (1860 amu and 4300 amu) prepared by the in-situ vapor deposition process and the ex-situ dip-coating process, respectively. The thickness of the lubricant film was controlled by the lube bath temperature and the deposition time in the vapor lube case, and by the lube concentration in the lube solution and the disc withdrawal speed in the dip-lube case.

The thickness of the lubricant overcoat in all cases was kept at 25 Å. The carbon overcoat had a thickness of about 30 Å and was that of sputtered amorphous carbon. An electrochemical potentiostatic technique was used to characterize their corrosion performance, which is measured in terms of total corrosion charge generated within a specific period of time under a specific biasing condition. The potentiostatic technique utilizes an electrolyte cell with the disk acting as an anode forming a circuit through the electrolyte with a Pt cathode. The circuit is completed with a potentiostat maintaining a constant potential drop between the two electrodes, while an ammeter in the circuit measures the corrosion current from which the corrosion charge can be determined.

Figure 4:
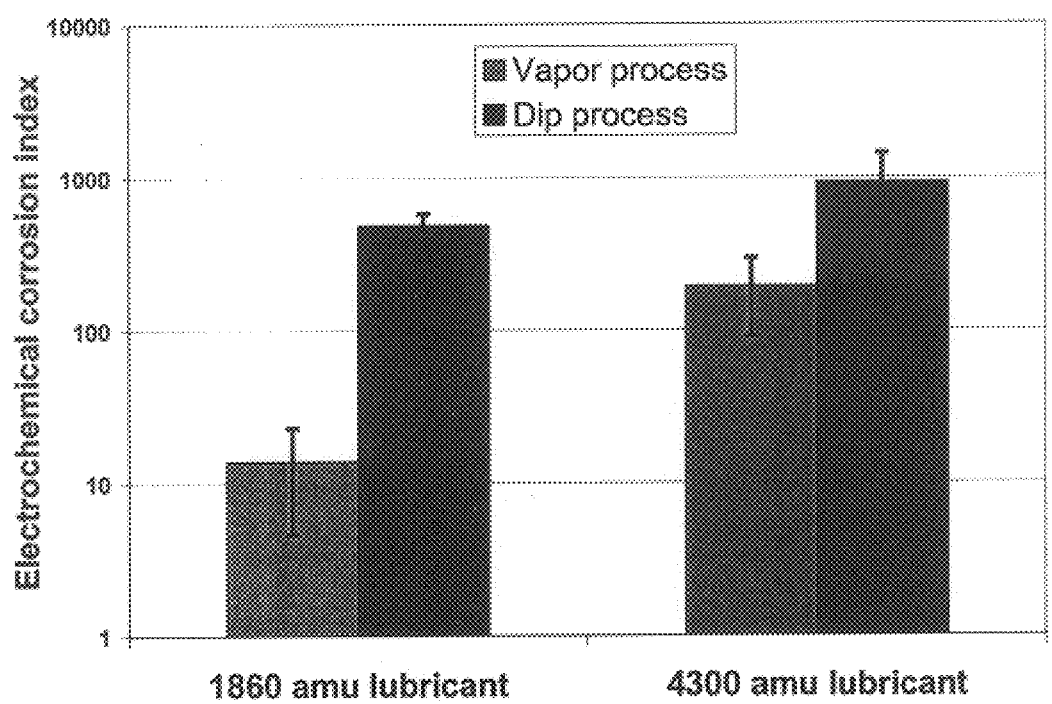
FIG. 4 shows the corrosion performance of otherwise identical media with 25 Å of 1860 and 4300 amu Zdol lubricants processed with in-situ vapor lube and ex-situ dip coating.

The results of the electrochemical potentiostatic technique are shown in FIG. 4. FIG. 4 shows the corrosion performance of otherwise identical media with 25 Å of 1860 and 4300 amu Zdol lubricants processed with in-situ vapor lube and ex-situ dip coating. FIG. 4 shows that the deposition of a vapor lube in-situ on a freshly prepared carbon surface, which would made the lube to be fully bonded to the carbon surface, produces recording media having a higher corrosion resistance than when the same lube is deposited ex-situ on the carbon surface by a dip process. FIG. 4 also demonstrates that the lower molecular weight lubricant media have better corrosion performance than their higher molecular weight counterparts. In fact, the low-molecular weight lubricant deposited by vapor-lube yields nearly two orders of magnitude lower corrosion than the high-molecular weight and dip-lube combination.

Thus, as an example of implementing this invention, the fully bonded under-layer of low-molecular weight species can have a thickness in the range of 5–15 Å and a molecular weight of <2500 amu. The mobile high molecular weight over-layer can use the same kind of functional lubricant as in the under-layer (e.g., Z-Tetraol), or a different kind of functional lubricant (e.g., Zdol), or a high-molecular weight non-functional lubricant. Its thickness can be in the range of 5–15 Å.

The media with such a dual layer overcoat design in which the first layer is an in-situ vapor deposited under-layer would exhibit improved corrosion resistance as well as maintain good HDI wear and flyability performance.

EXAMPLE 2

An example of the two-stage process of this invention is to attach, or add, a vacuum lubricant deposition module to a sputtering machine. A disc would undergo through the process of magnetic layer(s) deposition and carbon overcoat deposition, followed by the deposition of a bonded under-layer. The disc would then be taken out of the vacuum system, exposed to the ambient environment, and coated a mobile or minimally bonded lubricant-containing over-layer by means of dip lube or vapor lube. The material used for the bonded under-layer could to be a functional lubricant, such as Zdol, or Ztetraol, or Zdol-TX, or other functional perfluoropolyethers, or phosphazene or other kinds of derivatized lubricants, or could be just a lubricant additive such as phosphazene or phosfarol. The lubricant-containing over-layer could be functional perfluoropolyether lubricants, or phosphazene or other kinds of derivatized lubricants.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire invention of the patents and publications referred in this application are hereby incorporated herein by reference.

What is claimed is:

1. A magnetic recording medium, comprising:

a substrate;

a magnetic layer on the substrate;

a carbon overcoat on the magnetic layer; and a lubricant overcoat on the carbon overcoat, the lubricant overcoat comprising a vapor-deposited lubricant under-layer which is bonded to the carbon overcoat and a lubricant over-layer on said lubricant under-layer, wherein at least a portion of said lubricant over-layer can move on said lubricant under-layer, and wherein said lubricant under-layer is deposited on a fresh carbon surface by a vapor lube process.

2. The recording medium of claim 1, wherein said lubricant under-layer comprises a compound selected from the group consisting of functionalized perfluoropolyethers, functionalized perfluoropolyalkylethers, phosphazene and phosfarol.

3. The recording medium of claim 1, wherein said lubricant under-layer has a thickness from about 5 Å to about 15 Å.

4. The recording medium of claim 1, wherein said lubricant over-layer has a thickness from about 5 Å to about 15 Å.

5. The recording medium of claim 1, wherein said lubricant over-layer comprises a lubricant selected from the group consisting of perfluoropolyethers, functionalized perfluoropolyethers, perfluoropolyalkylethers, and functionalized perfluoropolyalkylethers.

6. The recording medium of claim 1, wherein the carbon overcoat has a thickness of from about 10 Å to about 80 Å, from about 10 Å to about 50 Å, and from about 10 Å to about 40 Å.

7. A method of making a magnetic recording medium, comprising:

providing a substrate with a magnetic layer, and a carbon overcoat; depositing a lubricant overcoat on the carbon overcoat, the lubricant overcoat comprising a vapor-deposited lubricant under-layer which is bonded to the carbon overcoat and a lubricant over-layer on said lubricant under-layer, wherein at least a portion of said lubricant over-layer can move on said lubricant under-layer, and wherein said lubricant under-layer is deposited on a fresh carbon surface by a vapor lube process.

8. The method of claim 7, wherein the carbon layer has a thickness of from about 10 Å to about 80 Å.

9. The method of claim 7, wherein we said lubricant under-layer has a thickness of from about 1 Å to about 30 Å.

10. The method of claim 7, wherein the said lubricant over-layer has a thickness of from about 1 Å to about 30 Å.

11. The method of claim 7, wherein said lubricant over-layer is deposited by a process selected from the group consisting of dip coating and vapor deposition.

12. A method for preventing corrosion of a magnetic layer due to contact start-stop of a recording medium, comprising depositing a carbon overcoat on the magnetic layer and depositing a lubricant overcoat on the carbon overcoat, the lubricant overcoat comprising a vapor-deposited lubricant under-layer which is bonded to the carbon overcoat and an a lubricant over-layer on said lubricant under-layer, wherein at least a portion of said lubricant over-layer can move on said lubricant under-layer, and wherein said lubricant under-layer is deposited on a fresh carbon surface by a vapor lube process.

\* \* \* \* \*